April 12, 1927. Re. 16,592

W. M. OSBORN

RAIL CHAIR

Original Filed June 27. 1924

Witness:
Richard J. Jacker

Inventor:
Warren M. Osborn
By J. M. Roberts, his atty.

Reissued Apr. 12, 1927.

Re. 16,592

UNITED STATES PATENT OFFICE.

WARREN M. OSBORN, OF CHICAGO, ILLINOIS.

RAIL CHAIR.

Original No. 1,518,871, dated December 9, 1924, Serial No. 722,724, filed June 27, 1924. Application for reissue filed December 1, 1926. Serial No. 152,039.

This invention relates to chairs for railway rails, and its object is to provide certain features of construction which afford novel advantages and capabilities in this class of devices when the chairs are either set into or fastened upon the top surfaces of wooden, concrete, metallic or composite railroad ties, or are set into or embedded in concrete roadbeds, and particularly in the chairs shown in my United States Patent No. 1,077,367, dated November 4, 1913.

Figure 1:
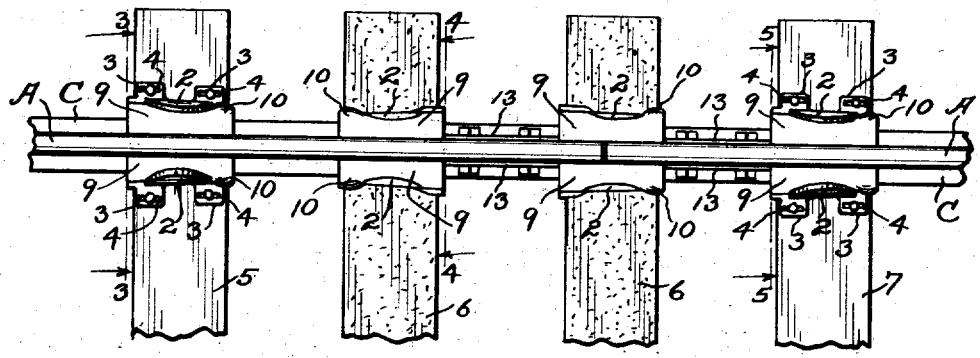
Figure 2:
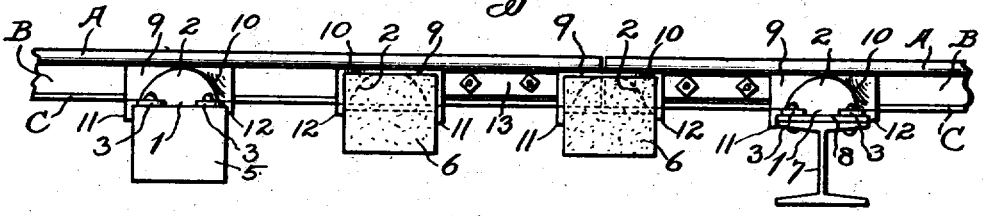
Figure 3:
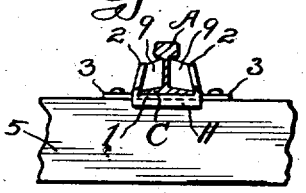
Figure 4:
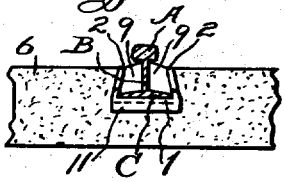
Figure 5:
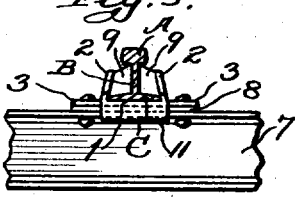
Figure 6:
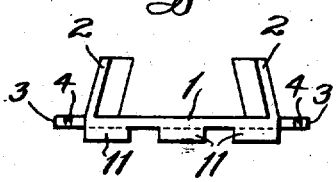
Figure 7:
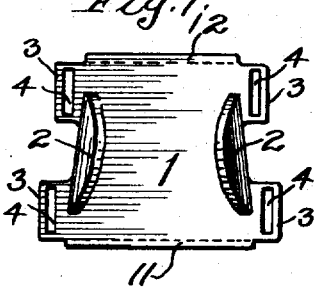

In the accompanying drawings, Fig. 1 is a plan view of a section of track equipped with chairs constructed in accordance with my invention; Fig. 2 is a view in side elevation of the same and shows the chairs applied to wood, concrete and metal ties; Fig. 3 is a view partly in side elevation and partly in section on the line 3—3 in Fig. 1; Fig. 4 is a similar view on the line 4—4 in Fig. 1; Fig. 5 is a similar view on the line 5—5 in Fig. 1; Fig. 6 is an end view on an enlarged scale showing the chair at the wide end of the rail-space; Fig. 7 is a plan view of the chair on an enlarged scale, and Fig. 8 is an end view of the chair at the narrow end of the rail-space.

In the drawings the reference letter A represents the head, B the web and C the base of a conventional rail.

The rail chair is made of metal and has a base 1 which acts as a tie-plate to support the rail. This base plate is provided with upwardly projecting side walls 2 which extend obliquely or angularly toward each other with relation to the longitudinal axis of the chair to form a tapering rail space between them; in some instances I prefer that the side walls shall also incline inwardly toward each other from the bottom upwardly, so that the intermediate area is wider not only at one end of the chair than at the other end, but is wider at its bottom than at the top at both ends to provide a tapering and dovetail or undercut rail-space. When the chair is to be placed on the top of a tie its base is provided with side ears 3 having holes 4 for the tie spikes or bolts (not shown); the ears are spaced inwardly from the ends of the base so that the bolts or spikes will not enter the ties close to the edges thereof but will be substantially within their area. If desired the chair may be seated more or less in a correspondingly shaped opening in the top of a wooden tie 5 or a concrete tie 6, and when the chair is used with a concrete tie 6 or with a metal tie 7 a cushioning block 8 of wood or other suitable material may be placed beneath it, as shown in Figs. 2 and 5, or the cushioning block may be placed in the chair as shown in Fig. 8. When the chairs have been positioned on the ties the rails are seated in the rail-spaces intermediate their side walls, and wedges 9, preferably made of waterproofed wood, are driven into the spaces between the side walls 2 and the sides of the rail. These wedges preferably have their opposite sides conforming to the contours of the sides of the rail and the side walls of the chairs respectively, as shown for example in Fig. 1 in my said patent; they are slightly larger in section than the spaces between the rail and side walls of the chair so that when seated they completely fill this space and they are of sufficient length to have their small ends extend beyond the side walls of the chairs when in place so that these ends may expand after they are in place and form keys to prevent them from working back or becoming loose, as indicated at 10 in Fig. 1. The side walls 2 preferably are shorter than the length of the base, and their ends may be curved or inclined toward each other from the bottom upwardly, so that the ends of the wedges may extend beyond their tops without projecting beyond the ends of the base; this reduced or shorter formation of the side walls enables the wedge to be driven into place with its large end flush with the base without danger of the driving-maul striking the side wall, and also enables the small end of the wedge to expand to form a key without projecting beyond the base, so that the assembled parts are compact and practically within the area of the tie. While I prefer to use wooden wedges as this material cushions the structure and eliminates noise, the wedges may be made of other material.

Figure 8:
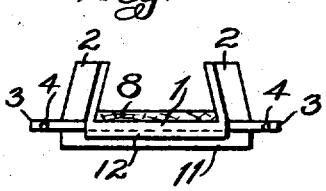

The chairs are primarily intended for use on one way track, set with the narrow end of the rail-space pointed in the direction of the traffic, and their bases are provided at the wide or approach end of the rail-space with depending lips 11, which may be formed in one piece as in Fig. 8 or in sections as in Fig. 6; these lips engage the forward sides of the ties and resist the tendency of the chairs to move longitudinally under the influence of the traffic or creeping of the rail, and consequently the spike or bolt holes 4 can be slotted or elongated in the line of the rail so that no longitudinal strains are imposed upon the spikes or bolts and their function is limited to holding the chairs and rail in track-gauge. When the chairs are used in two-way track, or when they are used with dimension ties, i. e., ties of standard or uniform widths such for example as metal or concrete ties, the bases may be provided at the narrow end of the rail space with depending lips 12, which resist all strains and stresses when traffic passes in the opposite direction and similarly take all longitudinal strains off the spikes. Also, when a chair is seated in an opening in the top of a tie the lips take all the longitudinal strains and stresses off of the seat in the tie so that its function is merely to hold the track in gauge. By using both lips the base is of box-like formation to embrace or engage both sides of the tie, so that the tendency of the chair to move and rattle on the tie is obviated. When the chairs are set into or embedded in concrete road-beds their lips engage the concrete to hold the chairs in track-gauge and prevent them from moving longitudinally.

Where a chair is used at a joint between the ends of two rails its wedges are driven in outside of the fish plates 13. The chairs may be set so that the wedges are all driven in one direction, or some of the chairs may be set so that their wedges will be driven in oppositely.

The relative lengths of the wedges and side walls are important as the small end of the wedge will get a positive hold on the wall due to its fibres pressing or expanding outward so as to lie against the edge of the wall after being compressed in the passage between the rail and wall.

I claim:

1. A metallic rail-chair having a base and side walls forming a tapering rail-space and having their tops shorter than the base, and wooden wedges adapted to be driven into said space and being longer than the tops of the side walls when in place.

2. A metallic rail-chair having a base and side walls forming a tapering rail-space and terminating short of the ends of the base, and wooden wedges adapted to be driven into said space and being longer than the side walls when in place.

3. A metallic rail-chair having a base, side walls forming a tapering rail space and terminating short of the ends of the base, a depending lip at the end of the base adjacent the wide end of said rail space, and wooden wedges adapted to be driven into said space and being longer than the side walls when in place.

4. A metallic rail-chair having a base, side walls forming a tapering rail-space and terminating short of the ends of the base, and a depending lip at each end of the base, and wooden wedges adapted to be driven into said space and being longer than the side walls when in place.

5. A metallic rail-chair having a base and side walls forming a tapering rail-space, and resilient sound deadening wedges adapted to be driven into said space between the side walls and an associated rail and being longer than the tops of the side walls when in place.

6. A metallic rail-chair having a base and side walls forming a tapering rail-space, a cushioning block seated in said space on the base, and resilient sound deadening wedges adapted to be driven into said space between the side walls and an associated rail and being longer than the tops of the side walls.

In testimony whereof I hereto affix my signature.

WARREN M. OSBORN.